(12) United States Patent
Humlicek et al.

(10) Patent No.: US 8,458,399 B2
(45) Date of Patent: Jun. 4, 2013

(54) METHODS AND STRUCTURE FOR DETERMINING CACHE SIZE IN A STORAGE SYSTEM

(75) Inventors: Donald R. Humlicek, Wichita, KS (US); Timothy R. Snider, Derby, KS (US); Brian D. McKean, Longmont, CO (US)

(73) Assignee: LSI Corporation, San Jose, CA (US)

( * ) Notice: Subject to any disclaimer, the term of this patent is extended or adjusted under 35 U.S.C. 154(b) by 260 days.

(21) Appl. No.: 12/948,321

(22) Filed: Nov. 17, 2010

(65) Prior Publication Data

US 2012/0124295 A1    May 17, 2012

(51) Int. Cl.
*G06F 12/00*    (2006.01)
(52) U.S. Cl.
USPC ................ 711/118; 711/170; 711/171
(58) Field of Classification Search
None
See application file for complete search history.

(56) References Cited

U.S. PATENT DOCUMENTS

| | | | | |
|---|---|---|---|---|
| 5,133,060 A | * | 7/1992 | Weber et al. | 711/113 |
| 5,257,370 A | * | 10/1993 | Letwin | 711/113 |
| 5,752,255 A | * | 5/1998 | Jarvis | 711/3 |
| 7,107,403 B2 | | 9/2006 | Modha et al. | |
| 2005/0071599 A1 | * | 3/2005 | Modha et al. | 711/170 |
| 2009/0083558 A1 | | 3/2009 | Sugiki et al. | |

OTHER PUBLICATIONS

Megiddo et al., "ARC: A Self-Tuning, Lowoverhead Replacement Cache," USENIX File & Storage Technologies Conference (FAST), Mar. 31, 2003, San Francisco, CA.
Chen et al., "Data Access History Cache and Associated Data Prefetching Mechanisms," Nov. 2007, (c) 2007 Association for Computing Machinery,SC07 Nov. 10-16, 2007, Reno, Nevada, USA.

* cited by examiner

*Primary Examiner* — Than Nguyen
(74) *Attorney, Agent, or Firm* — Duft Bornsen & Fettig LLP

(57) ABSTRACT

Methods and structure for automated determination and reconfiguration of the size of a cache memory in a storage system. Features and aspects hereof generate historical information regarding frequency of hits on cache lines in the cache memory. The history maintained is then analyzed to determine a desired cache memory size. The historical information regarding cache memory usage may be communicated to a user who may then direct the storage system to reconfigure its cache memory to a desired cache memory size. In other embodiments, the storage system may automatically determine the desired cache memory size and reconfigure its cache memory. The method may be performed automatically periodically, and/or in response to a user's request, and/or in response to detecting thrashing caused by least recently used (LRU) cache replacement algorithms in the storage system.

23 Claims, 5 Drawing Sheets

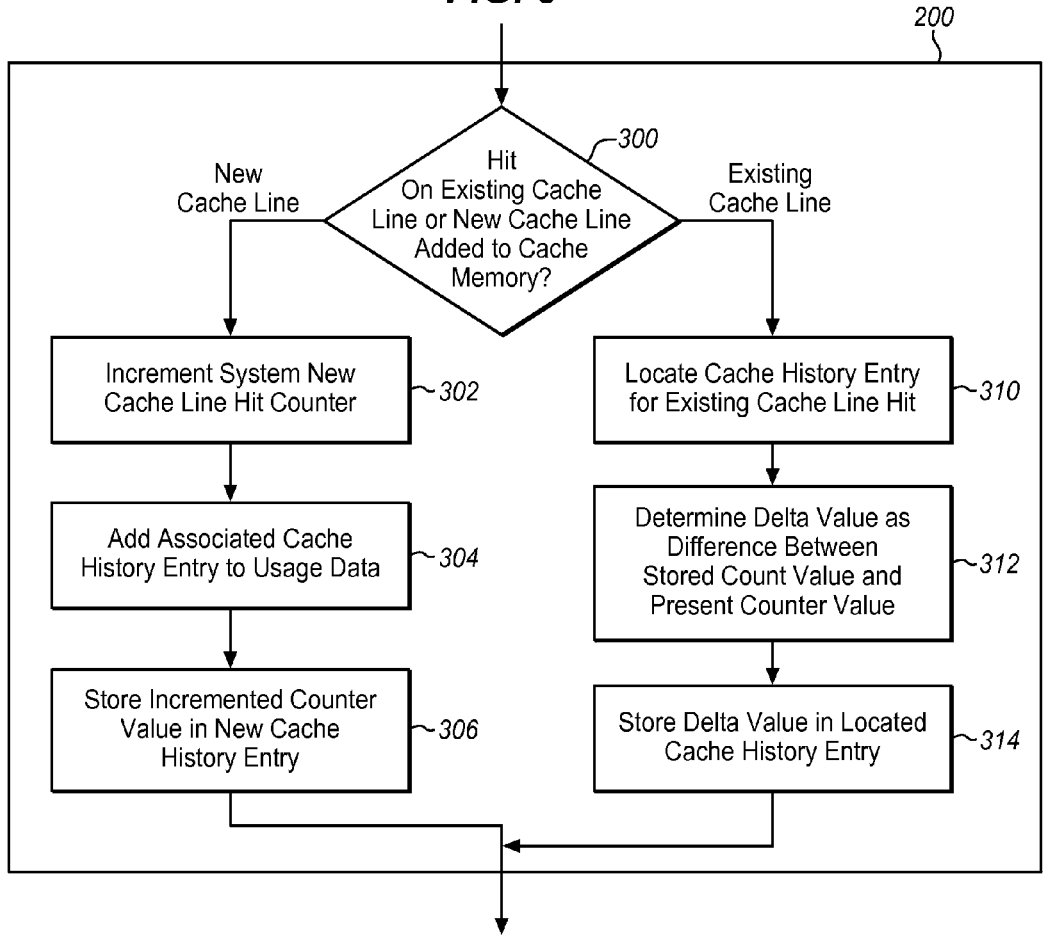
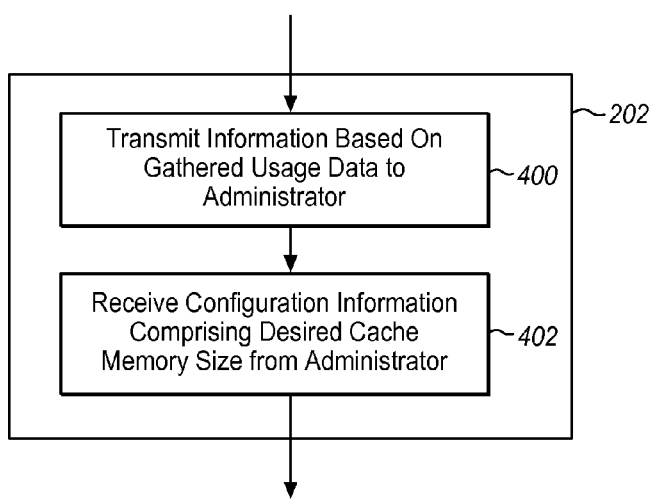

METHODS AND STRUCTURE FOR DETERMINING CACHE SIZE IN A STORAGE SYSTEM

BACKGROUND

1. Field of the Invention

The invention relates generally to storage systems utilizing cache memory and more specifically relates to methods and structures within the storage system for analyzing cache memory utilization to determine a desired cache memory size within the storage system for improved performance.

2. Discussion of Related Art

It is well known for storage systems to utilize cache memory. Cache memory is used in storage systems to improve the speed of processing I/O requests. Data written to the storage system may be stored in the cache memory so that subsequent read requests for the same data may be completed using the data in cache memory rather than the slower access typical of accessing data stored on storage devices (e.g., disk drives) of the storage system.

Cache memory for these storage subsystems is typically based on random access semiconductor memory (RAM) technology. Some storage systems use other tiers of data storage in order to optimize systems for performance or cost. For example, solid state devices (SSD) based on flash memory technology can be used as a medium to store information that can be accessed much faster than information stored on typical rotating magnetic or optical hard disk drives (HDD). The cache management routines typically contain mechanisms to track use of data. These mechanisms typically include a list of data blocks accessed, kept in least recently used (LRU) order for determining which blocks of data should be stored in the higher speed cache memory.

One problem with caching approaches to improve performance in storage system occurs when the amount of data that is frequently accessed through the storage system is larger than the amount of data that can fit into the higher performance cache or other tiered memories. When this happens, often the mechanisms that improve performance with smaller data sets begin to degrade performance due to "thrashing" of data into and out of the higher performance cache memory.

It is difficult to determine a priori the optimal size of a cache memory that will be beneficial to a specific workload on a specific storage system. Many storage systems provide several cache size options which generally must be tried to find out if they help in specific situations. Sometimes the cache memory size can be adjusted by operation of the storage system by re-allocating a memory subsystem to use more or less of the available memory for the caching functions. In other systems, the size of the cache may be determined at time of manufacture of the storage system but may be upgraded by field personnel or by end users.

The collection of data that is frequently accessed and thus may benefit from being stored in cache memory may be referred to as the "working set". If the working set size exceeds the present size of the cache memory, undesirable thrashing may take place wherein the storage system is frequently swapping data in and out of the cache memory. In such a case, an increased cache size may be desired to reduce the thrashing. However, as noted above, determining this size a priori for a particular storage system application is a difficult problem.

Thus, it is an ongoing challenge to efficiently determine an optimal size for cache memory in a storage system.

SUMMARY

The present invention solves the above and other problems, thereby advancing the state of the useful arts, by providing methods and structure for analyzing I/O operations and associated use of cache memory to determine a preferred size for the cache memory of the storage system. Based on the analysis, features and aspects hereof may advise an administrator of the analysis results to permit an administrator to reconfigure the storage system appropriately. Other features and aspects hereof utilize the analysis results within the storage system to automatically reconfigure the size of the cache memory to improve performance of the storage system.

In one aspect hereof, a method and computer readable medium embodying the method is provided. The method is operable in a storage system having a cache memory. The method determines a desired cache memory size and reconfigures the storage system to utilize the desired cache memory size. The method comprises tracking usage of cache memory in the storage system. The tracking gathers usage information for more data than can fit in the cache memory. The method then determines the desired cache memory size for the storage system based on the gathered usage information and utilizes the desired cache memory size in the storage system to reconfigure the size of the cache memory of the storage system.

Another aspect hereof provides a method operable in a storage system having a cache memory. The cache memory having a number of cache lines the number of which defines the present cache memory size. The method determines a desired cache memory size and reconfigures the storage system to utilize the desired cache memory size. The method comprises detecting a request to access a cache line in the cache memory and determining whether the requested cache line is a new cache line in the cache memory. Responsive to a determination that the request is to a new cache line, the method performs the additional steps of: incrementing a counter; creating a new cache history entry wherein the new cache history entry comprises information associating the new cache history entry with the new cache line; and storing the present count value of the counter in the new cache history entry. Responsive to a determination that the request is to an existing cache line, the method performs the additional steps of: locating the cache history entry associated with the requested cache line; subtracting the count value stored in the located cache history entry from the present count value of the counter to generate a delta value; and storing the delta value in the located cache history entry. The method then determines the desired cache memory size for the storage system based on the delta values in the cache history entries and utilizes the desired cache memory size in the storage system to reconfigure the size of the cache memory of the storage system.

BRIEF DESCRIPTION OF THE DRAWINGS

FIGS. 2 through 5 are flowcharts describing exemplary methods in accordance with features and aspects hereof to provide substantially automated determination of a desired cache memory size in a storage controller based on cache memory usage information and to provide reconfiguration of the storage controller to utilize the desired cache memory size.

DETAILED DESCRIPTION OF THE DRAWINGS

Figure 1:
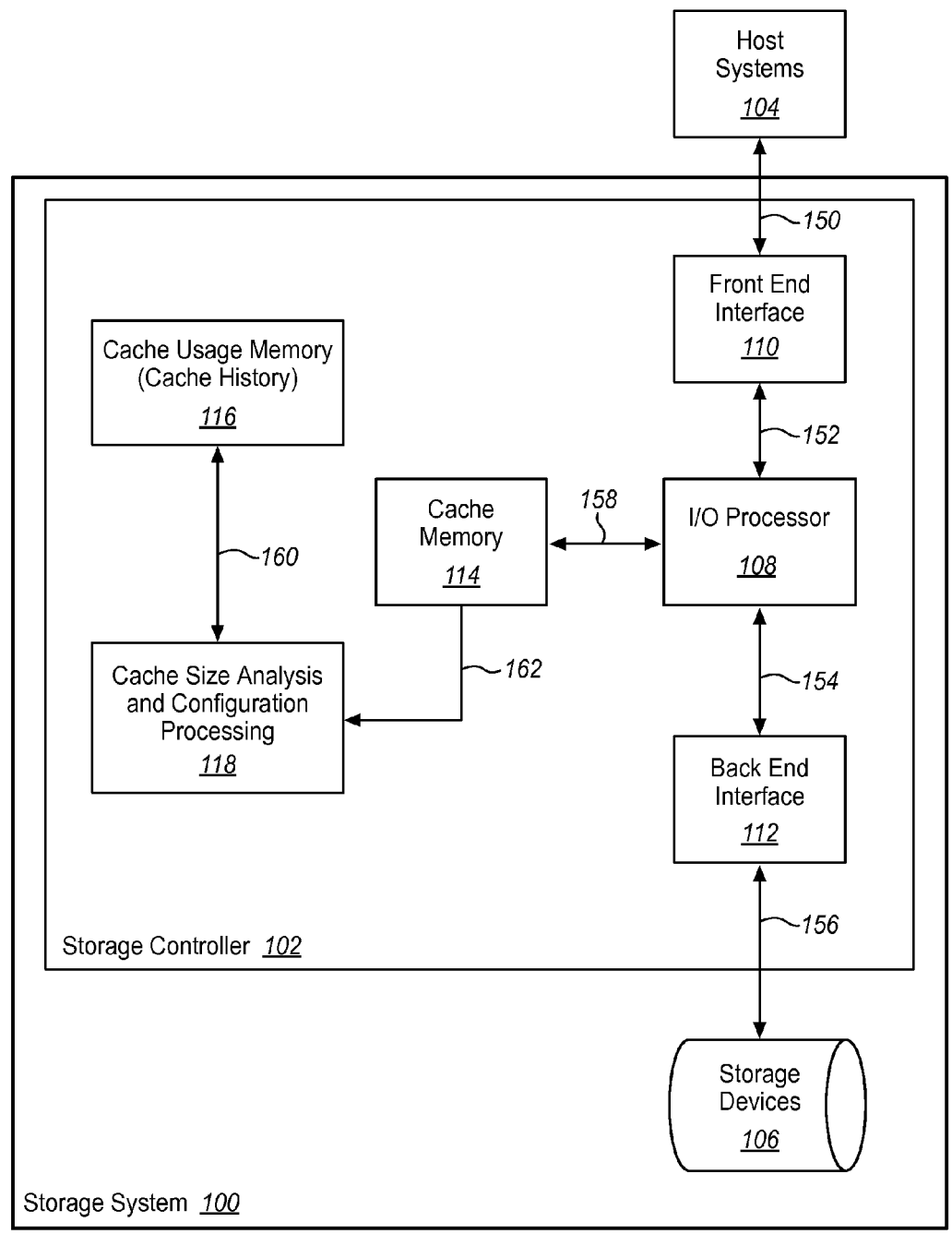
FIG. 1 is a block diagram of a system enhanced in accordance with features and aspects hereof to provide substantially automated determination of a desired cache memory size in a storage controller based on cache memory usage information and to provide reconfiguration of the storage controller to utilize the desired cache memory size.

FIG. 1 is a block diagram of an exemplary system 100 enhanced in accordance with features and aspects hereof to provide substantially automated determination and reconfiguration of a desired cache memory size in storage controller 102. System 100 comprises storage controller 102 adapted for coupling with one or more host systems 104 via path 150 and adapted for coupling with one or more storage devices 106 via path 156. Host systems 104 may be any suitable computing systems adapted to generate I/O write requests to store data on storage devices 106 of storage system 100. For example, host systems 104 may be personal computers, servers, workstations, etc. Storage devices 106 may be any device suitable for storing data received in host supplied I/O write requests including, for example, rotating magnetic and/or optical disk drives as well as semiconductor storage devices (e.g., flash drives, RAM disks, etc.).

I/O processor 108 within storage controller 102 receives I/O requests from host systems 104 via front end interface 110 and communication paths 150 and 152. Front end interface 110 may be any suitable circuitry and/or logic adapted for coupling storage controller 102 with host systems 104. For example, front end interface 110 may provide network interface capabilities, such as Ethernet using TCP/IP protocols, to couple storage system 100, through storage controller 102, to a network communication path 150. In processing I/O requests, I/O processor 108 may communicate with storage devices 106 through back end interface 112 and communication paths 154 and 156. Back end interface 112 comprises any suitable circuits and/or logic for coupling storage controller 102 with storage devices 106. For example, back end interface 112 may provide suitable circuits and logic for coupling to storage devices 106 utilizing parallel or serial attached SCSI, Serial Advanced Technology Attachment (SATA), Fibre Channel, or any of several other well-known communication media and protocols suitable for use by storage devices 106.

I/O processor 108 may comprise any suitable general or special purpose processor (CPU) and associated program memory adapted to store programmed instructions to be executed by the CPU. In general, I/O processor 108 may utilize cache memory 114 via communication path 158 to improve performance in processing of I/O requests. Write data supplied by host systems 104 in association with I/O write requests may be stored in cache memory 114 as well as persistently stored in storage devices 106. Subsequent I/O read requests may then be completed with reference to data stored in cache memory 114 rather than requiring slower access to storage devices 106. Cache size analysis and configuration processing element 118 monitors, via path 162, utilization of cache memory 114 by I/O processor 108. As data is initially added into cache memory 114 and as previously entered data is subsequently accessed in cache memory 114 (by I/O processor 108), cache size analysis and configuration processing element 118 generates and updates information in cache usage memory 116. Specifically, cache history entries are created and updated in cache usage memory 116 responsive to utilization of cache memory 114 by I/O processor 108. A plurality of such cache history entries are collectively referred to herein as "usage data" or "usage information". In one exemplary embodiment, cache size analysis and configuration processing element 118 may be implemented as a function programmed in the programmable instructions executed by I/O processor 108. In other exemplary embodiments, cache size analysis and configuration processing element 118 may be implemented as suitably designed custom logic circuits adapted to monitor utilization of cache memory 114 by I/O processor 108 and to generate, update, and analyze cache history entries stored in cache usage memory 116.

Responsive to any of several triggering events, cache size analysis and configuration processing element 118 may analyze the cache history entries stored in cache usage memory 116 to determine a desired cache memory size for ongoing use of cache memory 114 by storage controller 102. Based on the analysis of cache history entries, the size of cache memory 114 may be increased or decreased accordingly. In one exemplary embodiment, the desired cache memory size may be determined by automated processing of storage controller 102 and the cache memory 114 may be automatically reconfigured in accordance with the desired cache memory size. In other exemplary embodiments, analysis results generated by cache size analysis and configuration processing element 118 may be output to an administrative user to permit the administrative user to determine the desired cache memory size. A cache memory size so determined by an administrative user may then be communicated back to storage controller 102 to permit cache size analysis and configuration processing element 118 to reconfigure the size of cache memory 114.

In general, element 118 may be continually operable as a background function of controller 102 while I/O requests are processed. Any of several triggering events may initiate analytical processing by cache size analysis and configuration processing element 118 to determine and configure a new desired cache memory size. For example, element 118 may be operable on a periodic basis to evaluate historical utilization of cache memory 114 based on usage data (e.g. cache history entries) stored in cache usage memory 116. In addition, element 118 may be operable responsive to a user request to analyze the utilization of cache memory 114 to determine a desired cache memory size. Still further, element 118 may be operable responsive to detection of thrashing in operation of cache memory of 114 by I/O processor 108. As used herein, "thrashing" in utilization of cache memory 114 refers to frequent replacement of cache blocks in accordance with the least recently used (LRU) cache block replacement algorithms typically performed by I/O processor 108. Where LRU algorithms cause frequent replacement of cache blocks, it may be that analysis by element 118 could reveal that a different cache memory size would aid in reducing such thrashing Those of ordinary skill in the art will readily recognized numerous additional and equivalent components and functional elements within a fully functional storage system 100 and more specifically within a fully functional storage controller 102. Such additional and equivalent elements are omitted herein for simplicity and brevity of this discussion. Further, the communication paths shown in FIG. 1 coupling the various components and functional elements of controller 102 are intended merely to suggest typical communications between functional elements of a storage controller.

Figure 2:
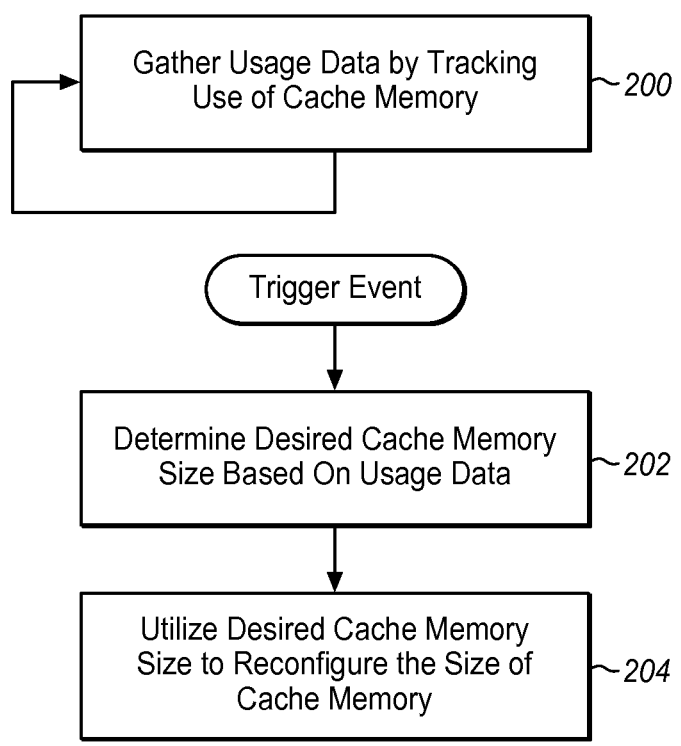

FIG. 2 is a flowchart describing an exemplary method for determining a desired cache memory size and for reconfiguring the size of a cache memory of the storage system responsive to the determination of a desired cache memory size of a storage controller in accordance with features and aspects hereof. The method of FIG. 2 may be operable, for example, in a storage controller such as storage controller 102 of FIG. 1. More specifically, the method of FIG. 2 may be operable in a cache size analysis and configuration processing element of a storage controller such as element 118 of FIG. 1. Such an element may be implemented as suitably programmed instructions to be executed by a general or special purpose processor of the storage controller and/or may be implemented as suitably designed custom logic circuits for providing the desired cache memory size analysis and configuration processing. At step 200, usage data is gathered by tracking use of the cache memory of the storage system. The usage data may be gathered for a predetermined period of time or may be gathered as a continual background process of the storage system. As noted above, the usage data may comprise cache history entries indicating usage of the cache memory over some period of time during which the usage data was gathered.

The cache history entries may be similar in structure to other meta-data structures commonly utilized by the storage system. For example, each cache history entry may be similar to the meta-data structure used for meta-data associated with each cache line or cache block of the cache memory. Additional information as discussed further herein below may be incorporated with each such cache history entry. In general, the number of such cache history entries will be substantially larger than the number of meta-data entries used to describe the cache lines or cache blocks of the cache memory. This allows the cache history meta-data to accumulate a significant volume of historical information regarding utilization of the cache memory regardless of the current size of the cache memory. At step 202, a desired cache memory size is determined based on the usage data gathered by step 200. As discussed further herein below, the desired cache memory size may be determined automatically by processing of the storage system and/or may be determined by interaction with an administrative user. The administrative user is provided with information derived from the usage data gathered at step 200. The user then returns revised configuration information indicating the desired cache memory size. However the desired cache memory size is determined, step 204 then utilizes the desired cache memory size so determined to reconfigure the present size of the cache memory.

Those of ordinary skill in the art will readily recognize that the cache memory size may be reconfigured by reconfiguring or designating portions of memory of the storage system to be used in caching. The reconfigured cache memory size may increase or decrease the size of the cache memory in accordance with the determined desired cache memory size. In some embodiments, where the cache memory components are configured with a predetermined, fixed size at time of manufacture of the storage controller/system, step 204 may comprise informing an administrative user that additional cache memory features may be purchased and may be beneficially utilized in the storage system.

FIG. 3 is a flowchart describing exemplary additional details of the processing of step 200 of FIG. 2 to gather usage data by tracking use of the cache memory. At step 300, a newly detected cache line access (by the I/O processor) is analyzed to determine whether it represents a "hit" on an existing cache line of the cache memory or rather represents the addition of a new cache line to cache memory. If the detected cache access represents the addition of a new cache line to cache memory, step 302 increments a system counter representing the count of new cache line hits. At step 304, a new cache history entry is generated and added to the usage data. The new cache history entry comprises information identifying the newly added cache line. At step 306, the present count value of the system counter indicating the number of new cache line hits is stored in the newly generated cache history entry. Processing of step 200 is then complete with respect to this cache line hit and processing of the storage system continues monitoring for further cache history information as an ongoing background task.

When step 300 determines that a detected cache line hit represents a hit on an existing cache line, step 310 locates the cache history entry corresponding to the cache line for the existing cache line hit. As noted above, the cache history entries include information identifying the cache line to which the cache history entry corresponds. Such information may include, for example, starting block address, extent, etc. to indicate the data associated with the existing cache line. Having so located the cache history entry associated with the cache line hit, step 312 determines a "delta value" as the difference between the stored count value in the located cache history entry and the present value of the system counter for new cache line hits. This difference indicates the number of new cache lines added to the cache memory since the last "hit" on this cache line. This delta value is then stored in the located cache history entry at step 314.

The gathered cache history entries (e.g., the "usage data" or "usage information") may be used as a basis for determining a desired cache memory size. FIG. 4 is a flowchart providing exemplary additional details of processing of step 202 of FIG. 2 to determine a desired cache memory size based on the gathered usage data. In the embodiment of FIG. 4, the usage data or information derived from the usage data is transmitted to an administrative user at step 400. The administrative user then determines (by any suitable means) a desired cache memory size based on the transmitted information. At step 402, the storage system receives configuration information from the administrative user where the configuration information comprises the desired cache memory size.

Figure 5:
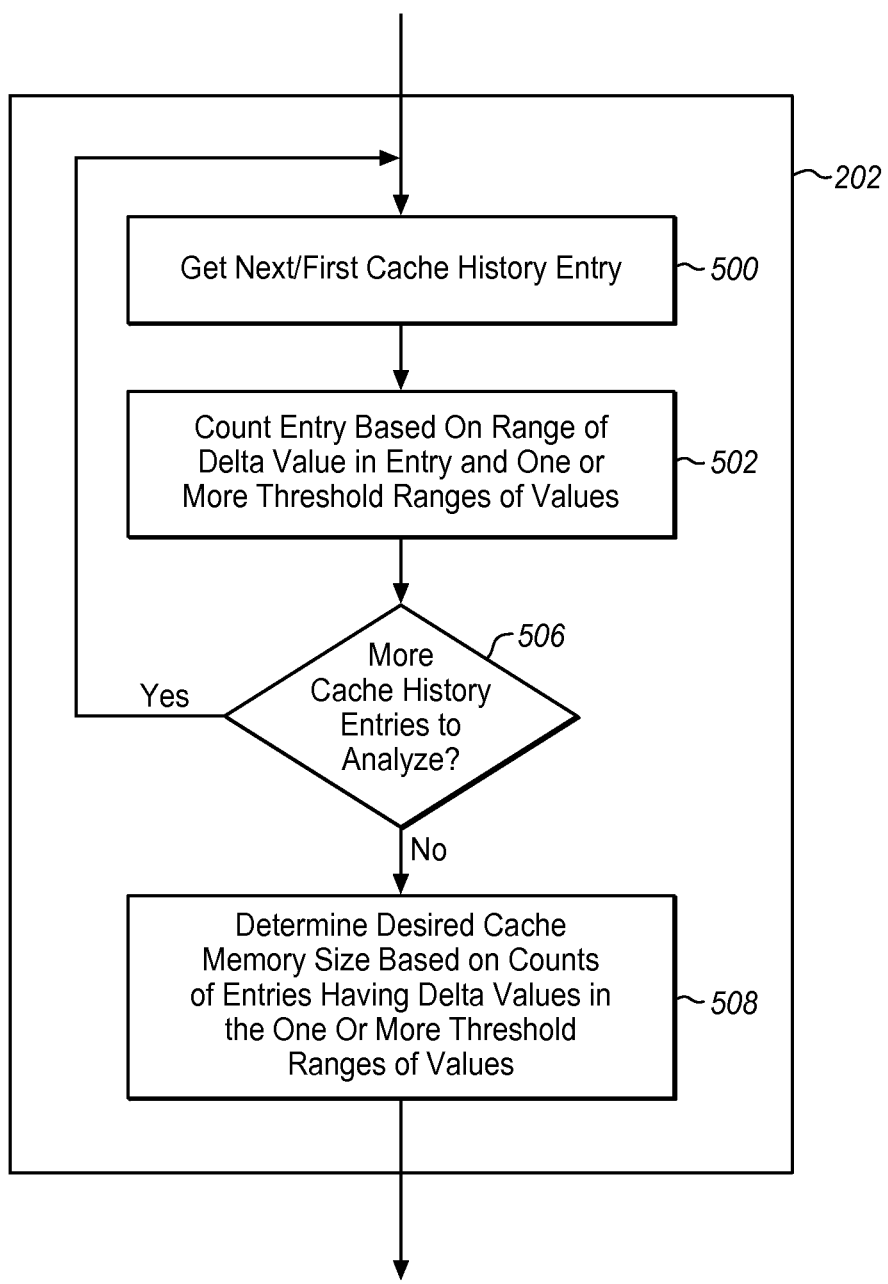

FIG. 5 is a flowchart describing exemplary additional details of another embodiment of the processing of step 202 to determine a desired cache memory size based on the gathered usage information. In the method of FIG. 5, the storage system automatically analyzes all the cache history entries to thereby automatically determine a desired cache memory size without the need for administrative user intervention or input. Steps 500 through 506 are iteratively operable to process each of the plurality of cache history entries that comprise the usage data/information gathered over some period of time. At step 500, a first/next cache history entry is retrieved. At step 502, the current retrieved cache history entry is processed/analyzed and at step 506 the method determines whether additional cache history entries remain to be analyzed. If so, processing continues looping back to step 500 until all cache history entries have been processed by step 502.

In general, the processing of step 502 counts the number of cache history entries that meet certain predefined threshold criteria relating to cache memory size. For example, the number of cache history entries having a delta value exceeding a predetermined threshold value may be determined as a percentage of the total number of cache history entries. The percentage of such cache history entries having delta values exceeding the predetermined threshold delta value may then be compared to a threshold percentage to determine whether an increase in the cache memory size is warranted and would be beneficial or, conversely, to determine that a reduction in cache memory size would not be harmful to performance of the storage system. Following completion of the counting by step 502 for all of the cache history entries, step 508 determines a desired cache memory size based on the various counts and based on one or more threshold ranges of values for such counts as determined by step 502.

Those of ordinary skill in the art will readily recognize a wide variety of algorithms and heuristic rules that may be applied for determining a desired cache memory size based on the usage information gathered by the storage system (e.g., based on analysis of the cache history entries). By reviewing the cache history entries of the usage data, the storage system can determine a distribution of the delta values for all of the cache history entries. As noted above, the delta values represent a number of blocks (e.g., cached lines) added to the cache memory in between accesses to a particular cache line or cache block. This distribution can then be used to determine the desired cache memory size for the storage system. For example, if relatively few of the delta values of the cache history entries indicate that any new cache line hits have occurred in between hits to each corresponding cache line, the storage system may reasonably conclude that a larger cache memory size would be of little or no benefit. If, on the other hand, a significant portion (e.g., 90%) of the cache history entries has a delta value of approximately double the number of cache lines in the cache memory as presently sized, the storage system may determine that performance would be significantly benefited by doubling the current cache memory size. This exemplary heuristic rule may be easily applied by determining the number of cache history entries having a delta value exceeding a predetermined threshold and then determining whether that number of cache history entries represents a percentage of the total cache history entries that exceeds a predetermined threshold percentage.

Still further, it is common that cache memory may be installed or configured in a storage system only in discrete quantum units of memory with a limited number of such configuration options available. For example, a system may have eight possible cache sizes to be configured. In such an exemplary embodiment, the cache memory size analysis and configuration logic of the storage system may utilize a table associating each of the possible cache sizes with a corresponding threshold value. The analysis of the cache history entries may then determine a comparative value to be applied to the table entries to determine which of the possible eight cache memory sizes would be most beneficial. Thus, each table entry may specify a cache memory size and a corresponding range of values for the percentage of cache history entries having a delta value at or below some predetermined threshold value.

The above examples and other heuristic and algorithmic functions may be applied for analysis of the cache history entries to determine whether a larger or smaller cache memory size would be beneficial to performance of the storage system. Still further, the cache usage information comprising the plurality of cache history entries may also be utilized in conjunction with, or as an alternative to, LRU cache block replacement algorithms. Thus, rather than a simplistic LRU analysis to identify a cache line or cache block to be removed from cache memory to make room for a new cache line or cache block, the usage information (e.g., plurality of cache history entries) may be utilized to identify particular cache lines that are infrequently used even if the cache lines were very recently used. Such frequency of use analysis may therefore enhance or replace the simplistic LRU analysis in most cache management approaches.

Figure 6:
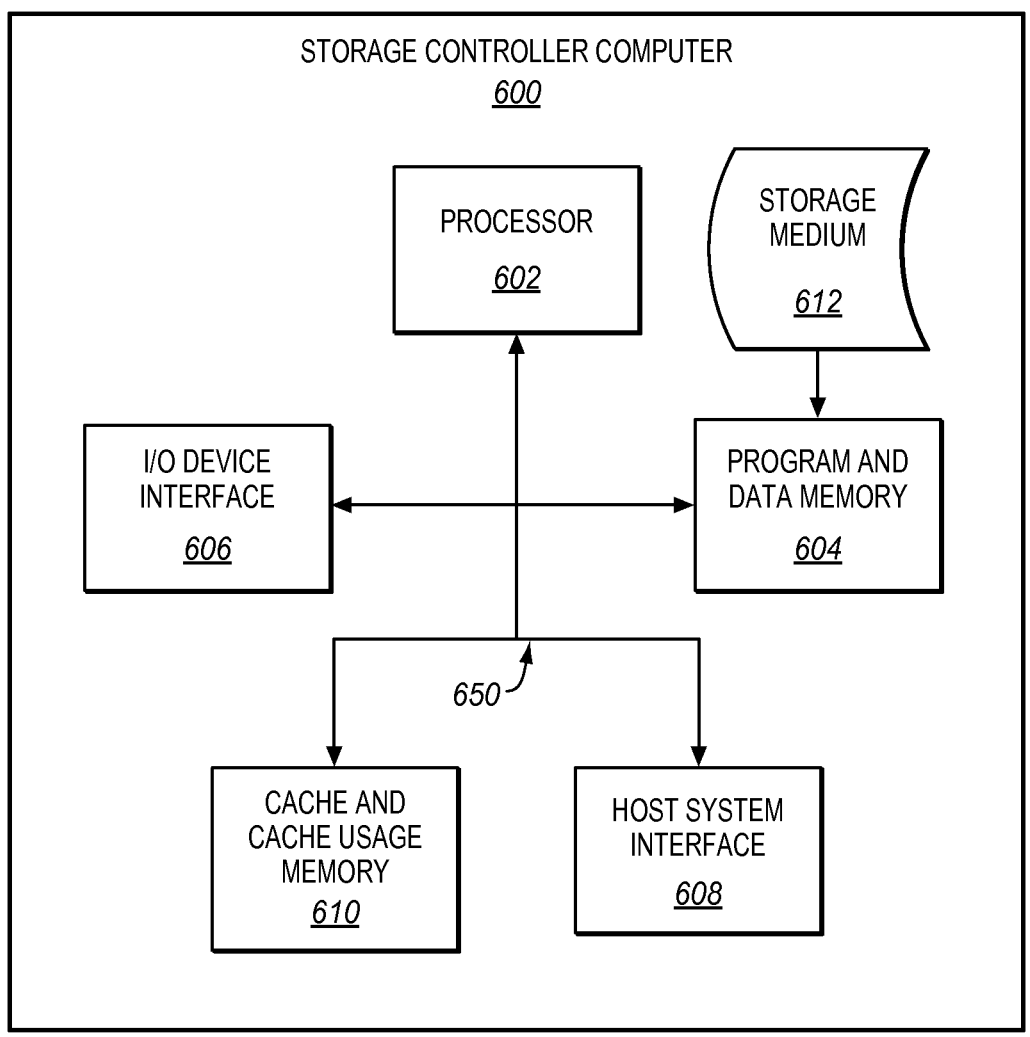
FIG. 6 is a block diagram of a computer system that uses a computer readable medium to load programmed instructions for performing methods in accordance with features and aspects hereof to provide substantially automated determination of a desired cache memory size in a storage controller based on cache memory usage information and to provide reconfiguration of the storage controller to utilize the desired cache memory size.

Embodiments of the invention can take the form of an entirely hardware (i.e., circuits) embodiment, an entirely software embodiment or an embodiment containing both hardware and software elements. In one embodiment, the invention is implemented in software, which includes but is not limited to firmware, resident software, microcode, etc. FIG. 6 is a block diagram depicting a storage controller computer 600 adapted to provide features and aspects hereof by executing programmed instructions and accessing data stored on a computer readable storage medium 612.

Furthermore, embodiments of the invention can take the form of a computer program product accessible from a computer-usable or computer-readable medium 612 providing program code for use by, or in connection with, a computer or any instruction execution system. For the purposes of this description, a computer-usable or computer readable medium can be any apparatus that can contain, store, communicate, propagate, or transport the program for use by or in connection with the computer, instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A storage controller computer 600 suitable for storing and/or executing program code will include at least one processor 602 coupled directly or indirectly to memory elements 604 through a system bus 650. The memory elements 604 can include local memory employed during actual execution of the program code, bulk storage, and cache memories that provide temporary storage of at least some program code in order to reduce the number of times code must be retrieved from bulk storage during execution. Cache and cache usage memory 610 may be accessed by processor 602 via bus 650 to manage usage data during processing of I/O requests.

Input/output interface 606 couples the controller to I/O devices to be controlled (e.g., storage devices, etc.). Host system interface 608 may also couple the computer 600 to other data processing systems.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method operable in a storage system having a cache memory, the method for determining a desired cache memory size and for reconfiguring the storage system to utilize the desired cache memory size, the method comprising:

tracking usage of cache memory in the storage system to gather usage information for more data than can fit in the cache memory, comprising:

maintaining a count value in a counter of the storage system, the count value indicating a number of new cache lines allocated in the cache memory responsive to processing I/O requests; and maintaining a cache history entry for each newly allocated cache line, wherein the cache history entry indicates the value of the counter when its corresponding cache line was newly allocated;
determining the desired cache memory size for the storage system based on the gathered usage information; and
utilizing the desired cache memory size in the storage system to reconfigure the size of the cache memory of the storage system.

2. The method of claim 1 wherein the step of determining further comprises:
transmitting information based on the gathered usage information to a user; and
receiving configuration information from a user, the configuration information comprising the desired cache size.

3. The method of claim 1 wherein the step of determining further comprises:
determining the desired cache memory size by operation of the storage system without user intervention.

4. The method of claim 1 wherein the step of tracking further comprises:
detecting a hit on a new cache line responsive to processing a subsequent I/O request; and
responsive to detecting the hit, storing a delta value in a cache history entry corresponding to the new cache line wherein the delta value is a difference between the count value indicated in the cache history entry and the present count value of the counter of the storage system.

5. The method of claim 4 wherein the step of determining further comprises:
determining a number of cache history entries that have a delta value greater than a predetermined threshold delta value; and
determining the desired cache memory size based on the predetermined threshold value and based on the determined number.

6. The method of claim 4 wherein the step of determining the desired cache memory size further comprises:
determining that a predetermined percentage of the cache history entries have delta values within an identified range of a plurality of predetermined ranges of values; and
determining the desired cache memory size based on the identified range.

7. The method of claim 4 wherein the step of determining the desired cache memory size further comprises:
determining that a predetermined percentage of the cache history entries have delta values within one or more identified ranges of a plurality of predetermined ranges of values wherein each identified range of values corresponds to a cache memory size; and
determining the desired cache memory size based on a preferred identified range of the one or more identified ranges wherein the preferred identified range corresponds to the smallest cache memory size of the one or more identified ranges.

8. A method operable in a storage system having a cache memory, the cache memory having a number of cache lines the number of which defines the present cache memory size, the method for determining a desired cache memory size and for reconfiguring the storage system to utilize the desired cache memory size, the method comprising:
detecting a request to access a cache line in the cache memory;
determining whether the requested cache line is a new cache line in the cache memory;
responsive to a determination that the request is to a new cache line, performing the additional steps of:
incrementing a counter;
creating a new cache history entry wherein the new cache history entry comprises information associating the new cache history entry with the new cache line; and
storing the present count value of the counter in the new cache history entry;
responsive to a determination that the request is to an existing cache line, performing the additional steps of:
locating the cache history entry associated with the requested cache line;
subtracting the count value stored in the located cache history entry from the present count value of the counter to generate a delta value; and
storing the delta value in the located cache history entry;
determining the desired cache memory size for the storage system based on the delta values in the cache history entries; and
utilizing the desired cache memory size in the storage system to reconfigure the size of the cache memory of the storage system.

9. The method of claim 8 wherein the step of determining further comprises:
transmitting information based on the cache history entries to a user; and
receiving configuration information from a user, the configuration information comprising the desired cache size.

10. The method of claim 8 wherein the step of determining further comprises:
determining the desired cache memory size by operation of the storage system without user intervention.

11. The method of claim 8 wherein the step of determining further comprises:
determining a number of cache history entries that have a delta value greater than a predetermined threshold delta value; and
determining the desired cache memory size based on the predetermined threshold value and based on the determined number.

12. The method of claim 8 wherein the step of determining the desired cache memory size further comprises:
determining that a predetermined percentage of the cache history entries have delta values within an identified range of a plurality of predetermined ranges of values; and
determining the desired cache memory size based on the identified range.

13. The method of claim 8 wherein the step of determining the desired cache memory size further comprises:
determining that a predetermined percentage of the cache history entries have delta values within one or more identified ranges of a plurality of predetermined ranges of values wherein each identified range of values corresponds to a cache memory size; and
determining the desired cache memory size based on a preferred identified range of the one or more identified ranges wherein the preferred identified range corresponds to the smallest cache memory size of the one or more identified ranges.

14. The method of claim 8 wherein the steps of determining the desired cache memory size and utilizing the desired cache memory size are performed periodically.

15. The method of claim 8 wherein the steps of determining the desired cache memory size and utilizing the desired cache memory size are performed in response to a user request.

16. The method of claim 8 wherein the cache memory is managed in the storage system in accordance with a least recently used (LRU) cache replacement algorithm to replace the content of cache lines presently in the cache memory with new contents,
the method further comprising detecting that thrashing in LRU management of the cache memory replacement of cache line contents has exceeded a predetermined threshold thrashing value,
wherein the steps of determining the desired cache memory size and utilizing the desired cache memory size are performed in response to detecting thrashing.

17. A non-transitory computer readable medium storing programmed instructions that, when executed by a computer of a storage system, perform a method for determining a desired cache memory size and for reconfiguring the storage system to utilize the desired cache memory size, the method comprising:
 tracking usage of cache memory in the storage system to gather usage information for more data than can fit in the cache memory, comprising:
  maintaining a count value in a counter of the storage system, the count value indicating a number of new cache lines allocated in the cache memory responsive to processing I/O requests; and
  maintaining a cache history entry for each newly allocated cache line, wherein the cache history entry indicates the value of the counter when its corresponding cache line was newly allocated;
 determining the desired cache memory size for the storage system based on the gathered usage information; and
 utilizing the desired cache memory size in the storage system to reconfigure the size of the cache memory of the storage system.

18. The medium of claim 17 wherein the step of determining further comprises:
transmitting information based on the gathered usage information to a user; and
receiving configuration information from a user, the configuration information comprising the desired cache size.

19. The medium of claim 17 wherein the step of determining further comprises:
determining the desired cache memory size by operation of the storage system without user intervention.

20. The medium of claim 17 wherein the step of tracking further comprises:
 detecting a hit on a new cache line responsive to processing a subsequent I/O request; and
 responsive to detecting the hit, storing a delta value in a cache history entry corresponding to the new cache line wherein the delta value is a difference between the count value indicated in the cache history entry and the present count value of the counter of the storage system.

21. The medium of claim 20 wherein the step of determining further comprises:
determining a number of cache history entries that have a delta value greater than a predetermined threshold delta value; and
determining the desired cache memory size based on the predetermined threshold value and based on the determined number.

22. The medium of claim 20 wherein the step of determining the desired cache memory size further comprises:
determining that a predetermined percentage of the cache history entries have delta values within an identified range of a plurality of predetermined ranges of values; and
determining the desired cache memory size based on the identified range.

23. The medium of claim 20 wherein the step of determining the desired cache memory size further comprises:
determining that a predetermined percentage of the cache history entries have delta values within one or more identified ranges of a plurality of predetermined ranges of values wherein each identified range of values corresponds to a cache memory size; and
determining the desired cache memory size based on a preferred identified range of the one or more identified ranges wherein the preferred identified range corresponds to the smallest cache memory size of the one or more identified ranges.

* * * * *